(12) United States Patent
Li (10) Patent No.: US 9,407,512 B2
(45) Date of Patent: Aug. 2, 2016

(54) METHOD AND APPARATUS FOR CONTROLLING TERMINAL'S ACCESS TO A WIRELESS NETWORK

(75) Inventor: Xiangyang Li, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 142 days.

(21) Appl. No.: 14/241,732

(22) PCT Filed: Aug. 14, 2012

(86) PCT No.: PCT/IB2012/001685
§ 371 (c)(1),
(2), (4) Date: Feb. 27, 2014

(87) PCT Pub. No.: WO2013/030659
PCT Pub. Date: Mar. 7, 2013

(65) Prior Publication Data
US 2014/0215072 A1    Jul. 31, 2014

(30) Foreign Application Priority Data

Sep. 2, 2011    (CN) .......................... 2011 1 0258080

(51) Int. Cl.
G06F 15/173    (2006.01)
H04L 12/24    (2006.01)
(Continued)

(52) U.S. Cl.
CPC .............. *H04L 41/50* (2013.01); *H04W 48/02* (2013.01); *H04W 4/003* (2013.01); *H04W 76/027* (2013.01)

(58) Field of Classification Search
USPC ................................................ 709/223, 225
See application file for complete search history.

(56) References Cited

U.S. PATENT DOCUMENTS

2008/0248763 A1* 10/2008 Park ...................... H04W 4/10
455/90.2
2009/0322890 A1* 12/2009 Bocking ................ G03B 17/00
455/419

FOREIGN PATENT DOCUMENTS

CN    101378328 A    3/2009
CN    101420361 A    4/2009
(Continued)

OTHER PUBLICATIONS

Supplementary European Search Report for corresponding European Application No. 12828654.9, dated Feb. 6, 2015, 8 pages.
(Continued)

*Primary Examiner* — Philip B Tran
(74) *Attorney, Agent, or Firm* — Fay Sharpe, LLP (57) ABSTRACT

The present invention sets forth a method and apparatus for controlling terminal's access to a wireless network. When PCC rules in PCRF or account expense information in OCS have been updated, the PCRF or OCS will notify a MDM server; the server determines access status of application(s) based on information in the notification and notifies the terminal; the terminal will update locally stored access status of the application based on access status of the application contained in the received notification message; when an application on the terminal initiates a request to access the wireless network, the terminal determines whether it is rejected or allowed to access the wireless network based on the locally stored access status of the application. With the present method, when an end user is not allowed to use some network applications due to expense issue or other policy constraint, although the terminal will automatically attempt to send a request to retry connection, that request to retry connection can not access wireless network, nor can it reach core network, so as to avoid consuming RF resource and core network resource.

14 Claims, 6 Drawing Sheets

(51) Int. Cl.
*H04W 48/02* (2009.01)
*H04W 4/00* (2009.01)
*H04W 76/02* (2009.01)

(56) References Cited

FOREIGN PATENT DOCUMENTS

| CN | 101730029 | A | | 6/2010 | |
|---|---|---|---|---|---|
| CN | EP 2268094 | A1 | * | 12/2010 | ............. H04L 12/14 |
| EP | 1 895 750 | A1 | | 3/2008 | |
| EP | 2296309 | A1 | | 3/2011 | |
| JP | 2005-252390 | A | | 9/2005 | |
| JP | 2006-340294 | A | | 12/2006 | |
| JP | 2007-329853 | A | | 12/2007 | |
| KR | 10-2011-0090990 | A | | 8/2011 | |
| WO | 2009/124436 | A1 | | 10/2009 | |

OTHER PUBLICATIONS

"3rd Generation Partnership Project; Technical Specification Group Services and System Aspects; Policy and charging control architecture," (Release 11), 3GPP TS 23.203, V11.2.0 (Jun. 2011), pp. 1-142.
International Search Report for PCT/IB2012/001685 dated Feb. 7, 2013.

* cited by examiner

Fig. 7

METHOD AND APPARATUS FOR CONTROLLING TERMINAL'S ACCESS TO A WIRELESS NETWORK

TECHNICAL FIELD

The present invention relates to communication networks, in particular, to a processing method and apparatus for controlling terminal's access in a mobile network.

DESCRIPTION OF THE RELATED ART

Figure 1:
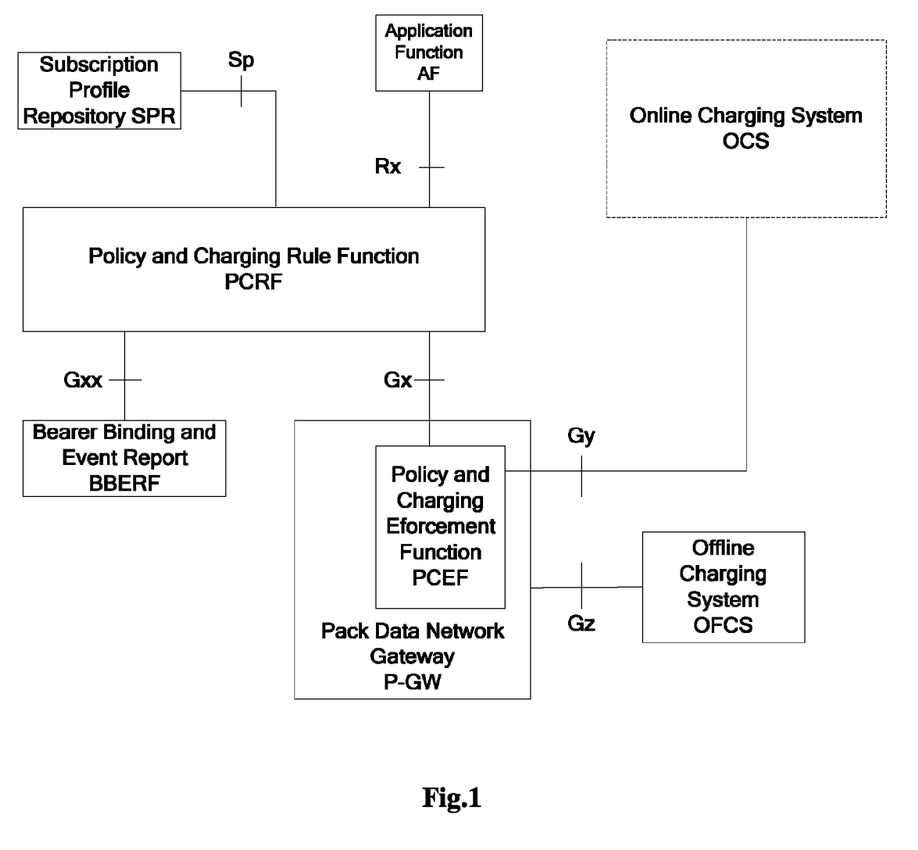
FIG. 1 is a diagram of a PCC architecture defined by 3GPP standard.

Policy and Charging Control (PCC) architecture defined in 3GPP standard is mainly shown as FIG. 1. Next, several functional bodies and interfaces therein related to the present invention will be briefly introduced.

Policy and Charging Rule Function (PCRF) is capable of making policy control decision and flow based charging control, and provides Policy and Charging Enforcement Function (PCEF) with network control functions as to traffic data flow detection, gating, QoS based and flow based charging (in addition to credit control). When a subscriber is roaming, PCRF interworking between roaming area and home area is needed, thus it can be divided into H-PCRF (Home PCRF) and V-PCRF (Visit PCRF) function.

Policy and Charging Enforcement Function (PCEF) is responsible for traffic data flow detection, policy enforcement and flow based charging, and is typically disposed at GGSN (Gateway GPRS Support Node) or P-GW (PDN (Packet Data Network)-GateWay).

Gx interface: located between PCRF and PCEF and is used to deliver policy and charging rule. This interface supports PCC information transfer at SDF (Service Data Flow) level, and supports transmission of wireless access technology information and location information.

Gy interface: located between PCEF and OCS (Online Charging System) and is used to deliver online charging control information.

Gz interface: located between PCEF and OFCS (Offline Charging System) and is used to deliver offline charging based data flow.

In PCC architecture of 3GPP, the Online Charging System (OCS) is capable of monitoring each subscriber's data flow in real-time. When a prepaid customer in network has consumed up the remaining balance, or a postpaid customer's data traffic has reached certain quota (e.g. 5 Gb per month), these customer's usage on some applications will be rejected by network. Similarly, when conditions of some PCC rules saved in PCRF are met, the network will also forbid the customer to use some network applications.

However, the current PCC architecture only monitors data flow from P-GW, even if PCC rules saved in PCRF and OCS will prohibit usage of some applications, however, in this case, certain application software on some smartphone will still automatically and periodically retry its connection with the application server, and repeatedly send a request to retry connection (such as Ping) to the application server. For example, weather forecast software on the phone will periodically collect information from the server, regardless of whether it is rejected due to expense issue.

Even if such request to retry connection will eventually be monitored and rejected by PCRF and OCS, the large number of requests to retry connection will consume a large amount of RF (Radio Frequency) resources, and will also increase the burden of core network, for example, P-GW will consume resource to detect such data flow and then send Diameter requests to OCS, the OCS will consume resource to check internal logic to eventually reject such requests.

Therefore, when an end user is not allowed to use some network applications due to expense issue or other policy constraint, how to prevent a terminal from automatically sending requests to retry connection so as to avoid consuming RF resource and core network resource has become a problem currently to be solved.

SUMMARY OF THE INVENTION

To address the above defects in prior art, the invention sets forth a method and apparatus for controlling terminal's access to a wireless network.

According to a first aspect of the invention, there is provided a method for controlling a terminal's access to a wireless network, comprising the steps of: a. when information stored in a monitor unit of a core network and related to access status of an application has been updated, sending, by the monitor unit, a notification message to a mobile device management server, the notification message contains therein the updated information related to access status of the application; b. determining, by the mobile device management server based on the information, a mobile terminal involved in the information and access status of a corresponding application on the mobile terminal; c. sending, by the mobile device management server, a notification message to the determined mobile terminal, the notification message contains therein the determined access status of the applications; d. updating, by the mobile terminal based on the access status of the application contained in the received notification message, locally stored access status of the application.

Preferably, the method further comprising the step of: e. when an application on the mobile terminal initiates a request to access the wireless network, determining, by the mobile terminal based on the locally stored access status of the application, whether it is rejected or allowed to access the wireless network.

Preferably, the monitor unit is a Policy and Charging Rule Function or an Online Charging System.

Preferably, the information related to access status of an application is PCC rules or account expense information.

Preferably, the access status of application is forbiding to access or allowing to access.

According to a second aspect of the invention, there is provided an apparatus for controlling terminal's access to a wireless network in a monitor unit of a core network, comprising: a first sending device configured to send a notification message to a mobile device management server when information stored in the monitor unit and related to access status of an application has been updated, the notification message contains therein the updated information related to access status of the application.

Preferably, the monitor unit is a Policy and Charging Rule Function or an Online Charging System.

Preferably, the information related to access status of an application is PCC rules or account expense information.

Preferably, the access status of the application is forbiding to access or allowing to access.

According to a third aspect of the invention, there is provided an apparatus for controlling terminal's access to a wireless network in a mobile device management server, comprising: a first receiving device configured to receive a notification message from a monitor unit of a core network, the notification message contains therein information related to access status of an application; a first determining device configured to determine, based on information contained in the notification message, a mobile terminal involved in the information and access status of a corresponding application on the mobile terminal; a second sending device configured to send a notification message to the determined mobile terminal, the notification message contains therein the determined access status of the applications.

Preferably, the monitor unit is a Policy and Charging Rule Function or an Online Charging System.

Preferably, the information related to the access status of an application is PCC rules or account expense information.

Preferably, the access status of the application is forbiding to access or allowing to access.

According to a fourth aspect of the invention, there is provided an apparatus in a mobile terminal for controlling the terminal's access to a wireless network, comprising: a second receiving device configured to receive a notification message from a mobile device management server, the notification message contains therein access status of an application; an updating device configured to update, based on the access status of the application contained in the received notification message, locally stored access status of the application.

Preferably, the apparatus further comprising: a second determining device configured to determine, when an application on the mobile terminal initiates a request to access the wireless network, whether it is rejected or allowed to access the wireless network based on the locally stored access status of the application.

Preferably, the access status of the application is forbiding to access or allowing to access.

With the method and apparatus of the invention, when an end user is not allowed to use some network applications due to expense issue or other policy constraint, although the terminal will automatically attempt to send a request to retry connection (e.g., a Ping request), that request to retry connection can not access wireless network, nor can it reach core network, so as to avoid consuming RF resource and core network resource due to a large number of requests to retry connection, thus, a great amount of resource can be saved for network and performance thereof can be improved.

BRIEF DESCRIPTION OF THE DRAWINGS

Other features, objects and advantages of the invention will become more apparent by reading the following detailed description of non-limiting embodiments with reference to accompany drawings, in which.

DETAILED DESCRIPTION OF THE PREFERRED EMBODIMENT

Next, various illustrative embodiments of the invention will be described in detail with reference to accompany drawings.

Figure 2:
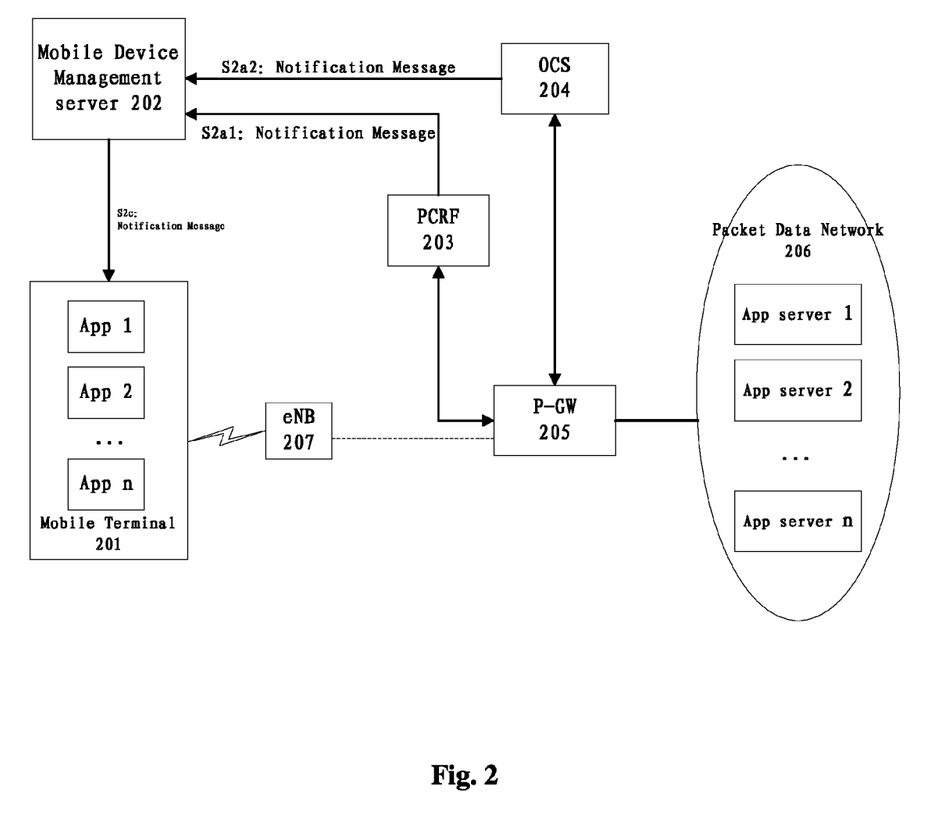
FIG. 2 is a diagram of an application scenario according to an embodiment of the invention.

FIG. 2 shows a diagram of an application scenario according to an embodiment of the invention. In FIG. 2, a mobile terminal 201 accesses eNB (evolved Node B) 207 via an air interface, and in turn accesses packet data network 206 via P-GW 205. The mobile terminal 201 has application 1, application 2, . . . application n run therein, and packet data network 206 has application server 1, application server 2, . . . application server n therein, wherein, application 1 needs to access application server 1, application 2 needs to access application server 2, . . . and so on, application n needs to access application server n.

FIG. 2 also includes a PCRF 203, an OCS 204 and a Mobile Device Management server 202. Functions of PCRF 203 and OCS 204 and interfaces between them and P-GW 205 have been briefly introduced in "Description of the Related Art". The Mobile Device Management (MDM) server 202 is used to manage mobile terminals within its administrative range, such as registration management, configure data, query, remote control etc. Accordingly, the mobile terminal 201 has been provided with a client program (not shown) for mobile device management. Mobile Device Management technology has been applied in many current systems, for example, it has been used in iPhone available from Apple Corporation, and it has also been used by Microsoft Corporation.

FIG. 2 is merely illustrative and only content related to the invention has been illustrated, those skilled in the art shall appreciate that, the system shall also comprise other necessary network elements and lines.

The basic idea of the invention is: set an access status for each application in the mobile terminal 201. Two new interfaces are added between PCRF 203 and MDM server 202, and between OCS 204 and MDM server 202, when information stored in PCRF 203 or OCS 204 and related to access status of application(s) has been updated, PCRF 203 or OCS 204 sends a notification message to the MDM server 202, then, the MDM server 202 further sends a notification message to the mobile terminal 201, the mobile terminal 201 updates local access status of application(s) in time based on information in the notification message.

Next, a method for controlling mobile terminal's access to a wireless network according to an embodiment of the invention will be described in detail in conjunction with FIG. 2.

The method starts from step S2a. When information stored in a monitor unit of a core network and related to access status of application(s) has been updated, the monitor unit in the core network sends a notification message to the MDM server 202, the notification message contains therein the updated information related to access status of application(s).

In one embodiment, the monitor unit in the core network is PCRF 203, when PCC rules saved in the PCRF 203 have been changed, the PCRF 203 will also send a notification message to the MDM server 202 while it sends a notification message to P-GW 205, as indicated in step S2a1 of FIG. 2, the notification message contains therein updated PCC rules. Here, the information related to access status of application(s) described above is PCC rules.

PCC rules will specify access rules for some applications. For example, some applications are always to access network, e.g. emergency application etc, while some applications are always to deny to access network, PCC rules remain unchanged for these applications.

While for most applications, their access rules change with condition, for example, application 1 can not access network during working hour on working day. When it is working hour, new PCC rule derived by PCRF 203 is application 1 is forbad to access, then PCRF 203 will notify P-GW 205 that application 1 can not access packet data network 206, at the same time, it will also send a notification message to the MDM server 202, as indicated in step S2a1 of FIG. 2, the notification message contains therein the updated PCC rule, i.e., application 1 can not access packet data network 206. When working hour is over, new PCC rule derived by PCRF 203 is application 1 is allowed to access, then PCRF 203 will notify P-GW 205 that application 1 can access packet data network 206, at the same time, it will also send a notification message to the MDM server 202, as indicated in step S2a1 of FIG. 2, the notification message contains therein the updated PCC rule, i.e., application 1 can access packet data network 206.

In another embodiment, the monitor unit in the core network is OCS 204, when account expense information saved in OCS 204 has been changed, OCS 204 will also send a notification message to the MDM server 202 while it sends a notification message to P-GW 205, as indicated in step S2a2 of FIG. 2, the notification message contains therein updated account expense information. Here, the information related to access status of application(s) described above is account expense information.

According to rules predefined by system, when account balance of a prepaid customer is insufficient or account quota of a postpaid customer has been reached, the mobile terminal 201 corresponding to that customer will forbid using some application such as application 1 and application 2, at this moment, the OCS 204 will notify P-GW 205, meanwhile, it will also send a notification message to the MDM server 202, as indicated in step S2a2 of FIG. 2, the notification message contains therein updated account expense information of the mobile terminal 201, i.e., account balance is insufficient or account quota has been reached. When the customer has recharged the account or spending limit has been reset, application 1 and application 2 in the mobile terminal 201 corresponding to that customer will be allowed to access network, at this moment, the OCS 204 will notify P-GW 205, meanwhile, it will also send a notification message to the MDM server 202, as indicated in step S2a2 of FIG. 2, the notification message contains therein updated account expense information of the mobile terminal 201, i.e., account balance is sufficient or spending limit has been reset.

Next, the method proceeds to step S2b (not shown). After the MDM server 202 receives the above notification message, it will determine mobile terminal(s) involved in the information and access status of corresponding application(s) on the mobile terminal(s) based on the information related to access status of application(s).

In one embodiment, the MDM server 202 receives a notification message from the PCRF 203 containing updated PCC rules, such as application 1 can not access packet data network 206, then the MDM server 202 will query for mobile terminal(s) containing application 1 so as to determine mobile terminal(s) involved in the information, and determine that access status of application 1 on the mobile terminal(s) is forbiding to access.

In another embodiment, the MDM server 202 receives a notification message from the OCS 204 containing updated account information, such as account balance corresponding to the mobile terminal 201 is insufficient or account quota has been reached, then according to rules predefined by system, the MDM server will determine that mobile terminal(s) involved in the information is mobile terminal 201, and determine that access status of application 1 and application 2 on the mobile terminal 201 is forbiding to access.

Then, the method proceeds to step S2c, as shown in FIG. 2, the MDM server 202 sends a notification message to the mobile terminal determined in step S2b, the notification message contains therein access status of application(s) determined in step S2b. For example, the mobile terminal determined by the MDM server 202 in step S2b is mobile terminal 201, the determined access status of application 1 and application 2 on the mobile terminal 201 is forbiding to access, then the MDM server 202 will send a notification message to the mobile terminal 201, as indicated in step S2c of FIG. 2, the notification message contains the following information: both access status of application 1 and application 2 are forbiding to access.

Next, step S2d is performed (not shown). The mobile terminal 201 updates locally stored access status of the application(s) based on the access status of application(s) contained in the received notification message. For example, in step S2c, information contained in the notification message sent by the MDM server 202 to the mobile terminal 201 is: both access status of application 1 and application 2 are forbiding to access, then based thereon, the mobile terminal 201 will update locally stored access status of application 1 and application 2 to forbiding to access.

Preferably, the method further comprises a step S2e (not shown). When an application on the mobile terminal 201 initiates a request to access the wireless network, the terminal determines whether it is rejected or allowed to access the wireless network based on the locally stored access status of the application. For example, application 1 on the mobile terminal 201 initiates a request to access the wireless network, if locally stored access status of application 1 is access allowed, then the mobile terminal 201 determines that application 1 is allowed to access network, a management program therein will invoke a RF module to initiate a request to eNB 208 and in turn access P-GW 205, then access the application server 1 in the packet data network 206; if locally stored access status of application 1 is forbiding to access, then the mobile terminal 201 determines that application 1 is forbad to access network, a management program therein will forbid application 1 to use RF resource, thereby rejecting that request at the terminal, that request can not reach eNB 208, nor can it even reach P-GW 205 and packet data network 206.

With the method of the invention, when an end user is not allowed to use some network applications due to expense issue or other policy constraint, although the terminal will automatically attempt to send a request to retry connection (e.g., a Ping request), that request to retry connection can not access wireless network, nor can it reach core network, so as to avoid consuming RF resource and core network resource.

Figure 3:
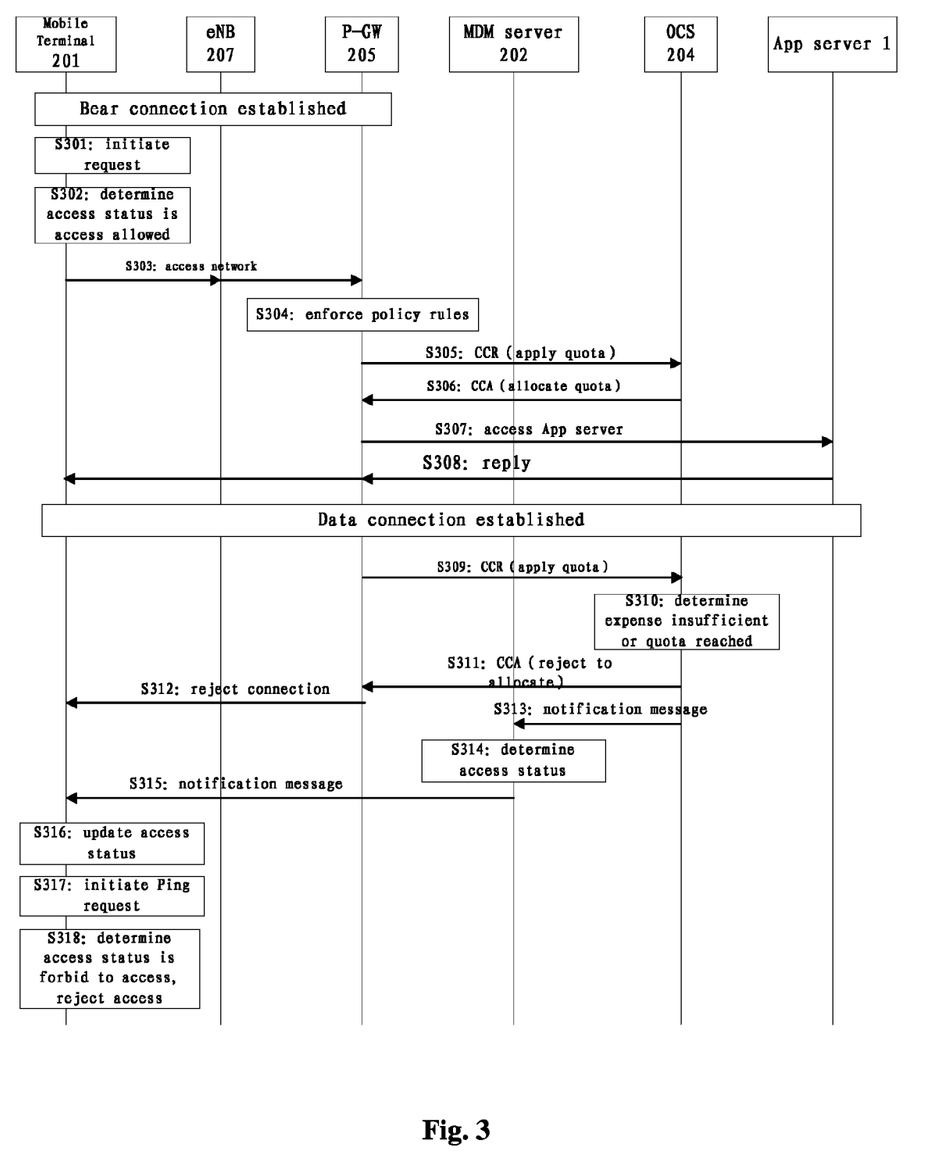
FIG. 3 is a flowchart of controlling a mobile terminal's access to a wireless network according to an embodiment of the invention.

FIG. 3 shows a flowchart of controlling a mobile terminal's access to a wireless network according to an embodiment of the invention. In this embodiment, initial access status of application 1 in the mobile terminal 201 is access allowed, and bearer connection between the mobile terminal 201 and P-GW 205 has been established. The process of the flowchart will be described in detail below.

First, at step S301, application 1 in the mobile terminal 201 initiates a request to access the application server 1.

In step S302, the mobile terminal 201 determines that access status of application 1 is access allowed, and allows application 1 to access network.

Next, in step S303, the mobile terminal 201 allocates RF resource to the request, such that the request access eNB 207, and further arrive P-GW 205.

In step S304, P-GW 205 enforces relevant policy rules and passes check on the application. At the same time, it is also determined that charging mode of the application is online charging.

Then, in step S305, the P-GW 205 sends a CCR (Credit Control Request) message to the OCS 204 to apply spending quota for the application's access.

In step S306, the OCS 204 sends a CCA (Credit Control Answer) message to the P-GW 205 to allocate spending quota for the application's access.

Then, in step S307, the P-GW 205 forwards the access request of the application to the application server 1.

In step S308, the application server 1 sends a reply message to the mobile terminal 201 via the P-GW 205 and the eNB 207.

Thus, data connection between the mobile terminal 201 and the application server 1 has been established. The application 1 in the mobile terminal 201 can access the application server 1, and meanwhile, the P-GW 205 and OCS 204 will perform charging and monitoring on the access in real time, once spending quota applied by the P-GW 205 has been consumed up, it will again apply new quota from the OCS 204, that is, the above step S305 and step S306 will be performed repeatedly.

After the process has been run for a period of time, it proceeds to step S309, where the P-GW 205 applies new quota from the OCS 204.

In step S310, the OCS 204 determines that expense balance on account of the mobile terminal 201 is insufficient or specified quota has been reached, and rejects to allocate new quota to the application.

Next, in step S311, the OCS 204 sends a CCA message to the P-GW 205, rejecting to allocate new quota.

In step S312, the P-GW 205 sends a message to the mobile terminal 201, rejecting the application 1 to access the application server 1.

At the same time as the OCS 204 sends a CCA message to the P-GW 205, the OCS 204 will also send a notification message to the MDM server 202, as indicated in step S313, in the notification message, the OCS 204 will notify the MDM server 202 of updated account expense information of the mobile terminal 201, i.e., balance is insufficient or specified quota has been reached.

In step S314, based on information in the received notification message, the MDM server 202 determines that its corresponding mobile terminal is mobile terminal 201 and determines that access status of the application 1 is forbiding to access.

Then, in step S315, the MDM server 202 sends a notification message to the mobile terminal 201, the notification message contains therein the latest access status of application 1, i.e., forbiding to access.

In step S316, the mobile terminal 201 updates locally stored access status of application 1 to forbid to access based on information in the received notification message.

After a period of time, the application 1 in the mobile terminal 201 initiates a Ping request to network to try to restore data connection, as indicated in step S317.

At this time, the mobile terminal 201 will perform step S318 and determine that access status of application 1 is forbiding to access, it will reject the request to access network and reject to allocate RF resource for the request, thus the Ping request can not reach eNB 207, nor can it even reach P-GW 205, so as to avoid the phenomenon that RF resources and core network resources are wasted by a large number of Ping requests.

Figure 4:
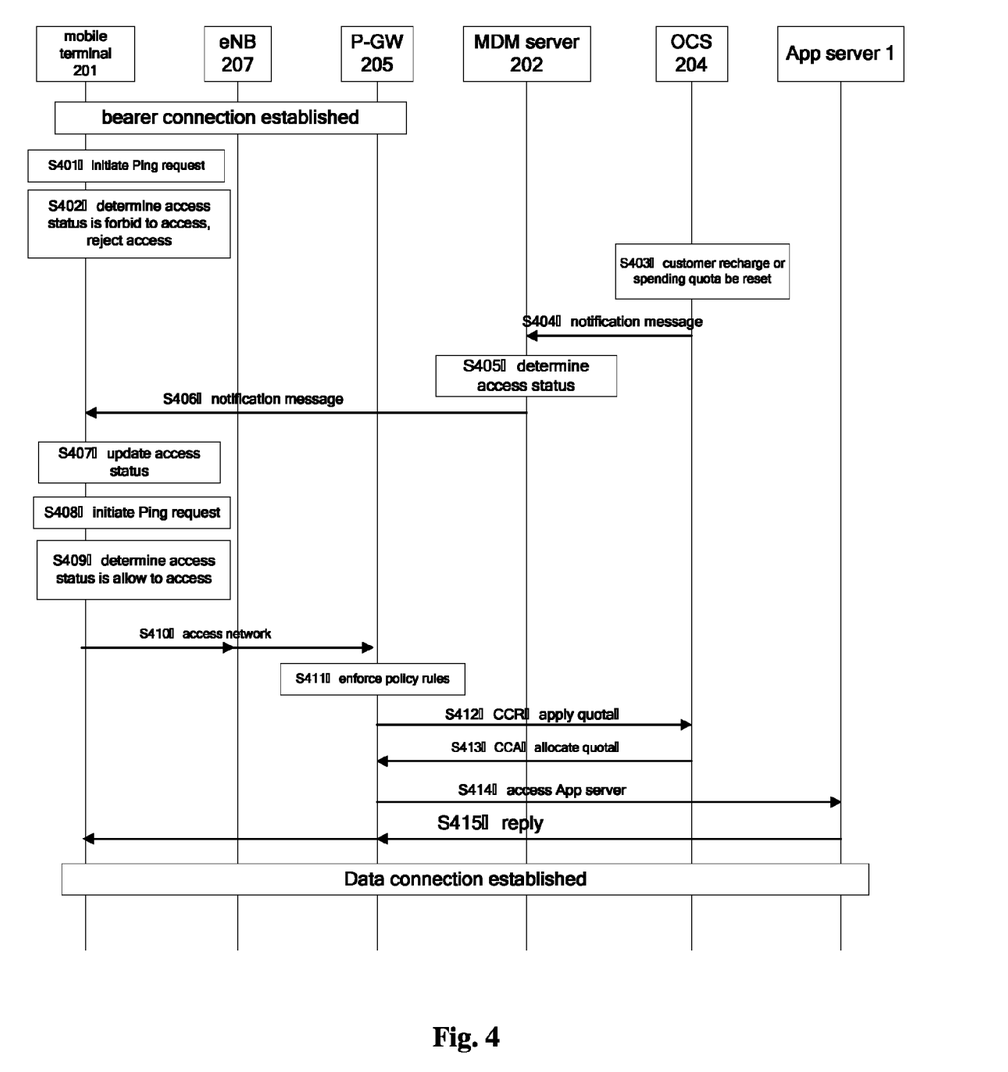
FIG. 4 is a flowchart of controlling a mobile terminal's access to a wireless network according to an embodiment of the invention.

FIG. 4 shows a flowchart of controlling a mobile terminal's access to a wireless network according to an embodiment of the invention. In this embodiment, initial access status of application 1 in the mobile terminal 201 is forbiding to access, and bearer connection between the mobile terminal 201 and P-GW 205 has been established. The process of the flowchart will be described in detail below.

In step S401, the application 1 in the mobile terminal 201 initiates a Ping request to network to try to restore data connection.

In step S402, the mobile terminal 201 determines that access status of application 1 is forbiding to access, it will reject the request to access network, and reject to allocate RF resource to the application 1, thus the Ping request can not reach eNB 207, nor can it even reach P-GW 205.

In step S403, a customer of the mobile terminal 201 recharges his/her account or spending quota thereof is reset by system.

After that, the OCS 204 will send a notification message to the MDM server 202, as indicated in step S404, in the notification message, the OCS 204 will notify the MDM server 202 of updated account expense information of the mobile terminal 201, i.e., account balance is sufficient or spending amount has been reset.

Then, in step S405, based on information in the received notification message, the MDM server 202 determines that its corresponding mobile terminal is mobile terminal 201 and determines that access status of the application 1 is access allowed.

Then, in step S406, the MDM server 202 sends a notification message to the mobile terminal 201, the notification message contains therein the latest access status of application 1, i.e., access allowed.

In step S407, the mobile terminal 201 updates locally stored access status of application 1 to access allowed based on information in the received notification message.

In step S408, the application 1 in the mobile terminal 201 again initiates a Ping request to try to connect to network.

In step S409, the mobile terminal 201 determines that access status of application 1 is access allowed, it will allow the request to access network.

Next, in step S410, the mobile terminal 201 allocates RF resources to the request, such that the request can access eNB 207 and further arrives P-GW 205.

In step S411, the P-GW 205 enforces relevant policy rules and passes check on the application. At the same time, it is also determined that charging mode of the application is online charging.

Then, in step S412, the P-GW 205 sends a CCR message to the OCS 204 to apply spending quota for the application's access.

In step S413, the OCS 204 sends a CCA message to the P-GW 205 to allocate spending quota for the application's access.

Then, in step S414, the P-GW 205 forwards the access request of the application to the application server 1.

In step S415, the application server 1 sends a reply message to the mobile terminal 201 via the P-GW 205 and the eNB 207.

Thus, data connection between the mobile terminal 201 and the application server 1 has been established, and the application 1 in the mobile terminal 201 can access the application server 1.

Figure 5:
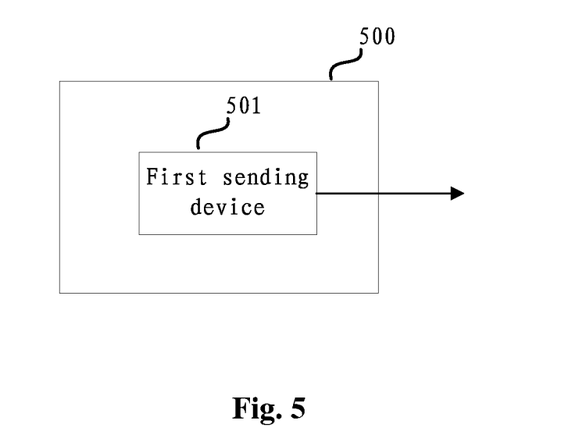
FIG. 5 is a structural block diagram of an apparatus for controlling mobile terminal's access to a wireless network in a monitor unit of a core network according to an embodiment of the invention.

FIG. 5 shows a structural block diagram of an apparatus for controlling mobile terminal's access to a wireless network in a monitor unit of a core network according to an embodiment of the invention. In FIG. 5, the apparatus 500 comprises a first sending device 501. Next, the working process of apparatus 500 will be described in detail in conjunction with FIG. 2.

When information stored in a monitor unit and related to access status of application(s) has been updated, the first sending device 501 sends a notification message to the MDM server, the notification message contains therein the updated information related to access status of application(s). Optionally, the access status of application(s) is forbiding to access or allowing to access.

In one embodiment, the monitor unit in the core network is PCRF 203, the information related to access status of application(s) is PCC rules. When PCC rules saved in the PCRF 203 have been changed, the first sending device 501 will also send a notification message to the MDM server 202, as indicated in step S2a1 of FIG. 2, the notification message contains therein updated PCC rules.

For example, application 1 can not access network during working hour on working day. When it is working hour, new PCC rule derived by PCRF 203 is application 1 is forbad to access, then the first sending device 501 will send a notification message to the MDM server 202, as indicated in step S2a1 of FIG. 2, the notification message contains therein the updated PCC rule, i.e., application 1 can not access packet data network 206. When working hour is over, new PCC rule derived by PCRF 203 is application 1 is allowed to access, then the first sending device 501 will send a notification message to the MDM server 202, as indicated in step S2a1 of FIG. 2, the notification message contains therein the updated PCC rule, i.e., application 1 can access packet data network 206.

In another embodiment, the monitor unit in the core network is OCS 204, and the information related to access status of application(s) is account expense information. When account expense information saved in OCS 204 has been changed, the first sending device 501 will send a notification message to the MDM server 202, as indicated in step S2a2 of FIG. 2, the notification message contains therein updated account expense information.

According to rules predefined by system, when account balance of a prepaid customer is insufficient or account quota of a postpaid customer has been reached, the mobile terminal 201 corresponding to that customer will forbid using some application such as application 1 and application 2, at this moment, the first sending device 501 will send a notification message to the MDM server 202, as indicated in step S2a2 of FIG. 2, the notification message contains therein updated account expense information of the mobile terminal 201, i.e., account balance is insufficient or account quota has been reached. When the customer has recharged the account or spending limit has been reset, application 1 and application 2 in the mobile terminal 201 corresponding to that customer will be allowed to access network, at this moment, the first sending device 501 will send a notification message to the MDM server 202, as indicated in step S2a2 of FIG. 2, the notification message contains therein updated account expense information of the mobile terminal 201, i.e., account balance is sufficient or spending limit has been reset.

Figure 6:
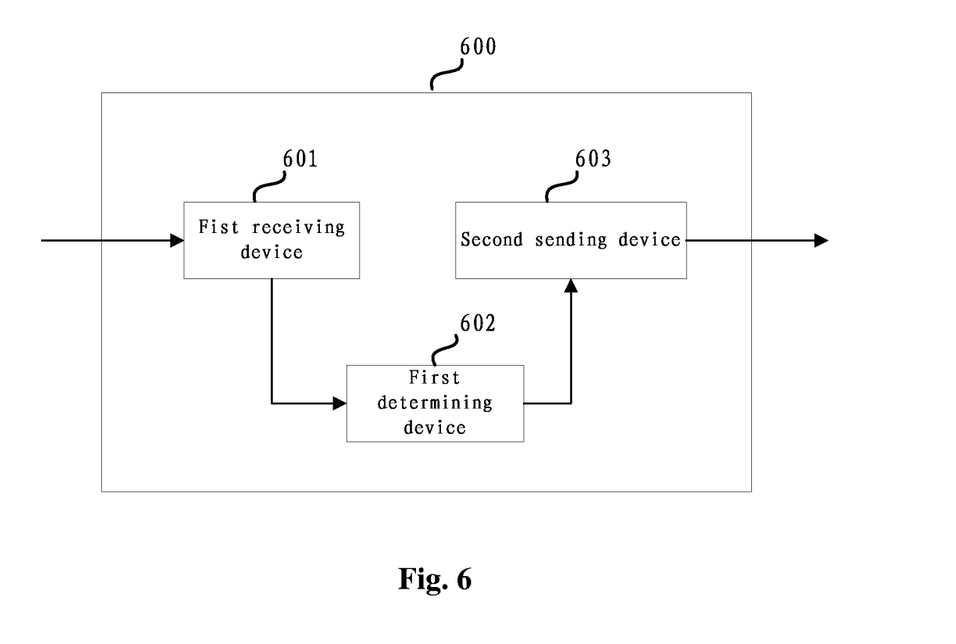
FIG. 6 is a structural block diagram of an apparatus for controlling mobile terminal's access to a wireless network in a MDM server according to an embodiment of the invention.

FIG. 6 shows a structural block diagram of an apparatus for controlling mobile terminal's access to a wireless network in a MDM server according to an embodiment of the invention. In FIG. 6, the apparatus 600 comprises a first receiving device 601, a first determining device 602, a second sending device 603. Next, the working process of apparatus 600 will be described in detail in conjunction with FIG. 2.

First, the first receiving device 601 receives a notification message from a monitor unit of a core network, the notification message contains therein information related to access status of application(s). Then, the first determining device 602 determines, based on the information related to access status of application(s), mobile terminal(s) involved in the information and access status of corresponding application(s) on the mobile terminal(s). Optionally, the access status of application(s) is forbiding to access or allowing to access.

In one embodiment, the monitor unit in the core network is PCRF 203, the information related to access status of application(s) is PCC rules. The first receiving device 601 receives a notification message from the PCRF 203 containing updated PCC rules, such as application 1 can not access packet data network 206, then the first receiving device 601 will query for mobile terminal(s) containing application 1 so as to determine mobile terminal(s) involved in the information, and determine that access status of application 1 on the mobile terminal(s) is forbiding to access.

In another embodiment, the monitor unit in the core network is OCS 204, and the information related to access status of application(s) is account expense information. The first receiving device 601 receives a notification message from the OCS 204 containing updated account information, such as account balance corresponding to the mobile terminal 201 is insufficient or account quota has been reached, then according to rules predefined by system, the first receiving device 601 will determine that mobile terminal(s) involved in the information is mobile terminal 201, and determine that access status of application 1 and application 2 on the mobile terminal 201 is forbiding to access.

Then, the second sending device 603 sends a notification message to the above determined mobile terminal, the notification message contains therein access status of the determined application(s). For example, the mobile terminal determined by the first determining device 602 is mobile terminal 201, the determined access status of application 1 and application 2 on the mobile terminal 201 is forbiding to access, then the second sending device 603 will send a notification message to the mobile terminal 201, as indicated in step S2c of FIG. 2, the notification message contains the following information: both access status of application 1 and application 2 are forbid to access.

Figure 7:
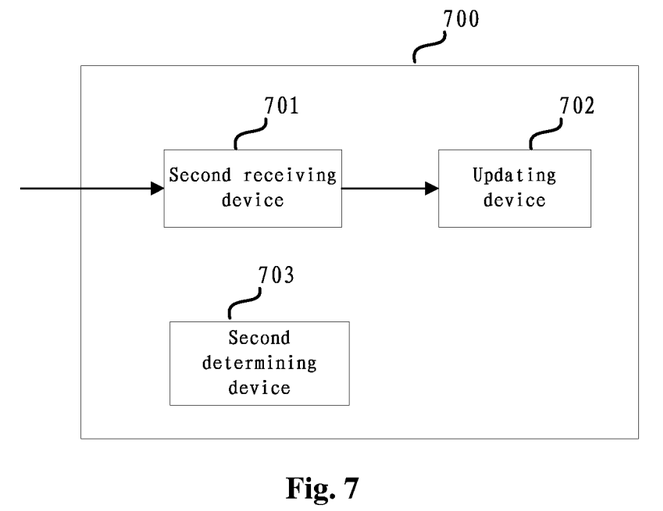
FIG. 7 is a structural block diagram of an apparatus in a mobile terminal for controlling the mobile terminal's access to a wireless network according to an embodiment of the invention.

FIG. 7 shows a structural block diagram of an apparatus in a mobile terminal for controlling the mobile terminal's access to a wireless network according to an embodiment of the invention. In FIG. 7, the apparatus 700 comprises a second receiving device 701, an updating device 702, a second determining device 703. Next, the working process of apparatus 700 will be described in detail in conjunction with FIG. 2.

First, the second receiving device 701 receives a notification message from the MDM server 202, the notification message contains therein access status of application(s). Then, the updating device 702 updates, based on the access status of application(s) contained in the received notification message, locally stored access status of the application(s). Optionally, the access status of application(s) is forbiding to access or allowing to access.

For example, when information contained in the notification message received by the second receiving device 701 from the MDM server 202 is both access status of application 1 and application 2 are forbid to access, then, based on this, the updating device 702 will update locally stored access status of application 1 and application 2 to both forbid to access.

Preferably, when an application on the mobile terminal 201 initiates a request to access the wireless network, the second determining device 703 determines whether it is rejected or allowed to access the wireless network based on the locally stored access status of the application. For example, application 1 on the mobile terminal 201 initiates a request to access the wireless network, if locally stored access status of application 1 is access allowed, then the second determining device 703 determines that application 1 is allowed to access network, a management program in the mobile terminal 201 will invoke a RF module to initiate a request to eNB 208 and in turn access P-GW 205, then access the application server 1 in the packet data network 206; if locally stored access status of application 1 is forbiding to access, then the second determining device 703 determines that application 1 is forbad to access network, a management program in the mobile terminal 201 will forbid application 1 to use RF resource, thereby rejecting that request at the terminal, that request can not reach eNB 208, nor can it even reach P-GW 205 and packet data network 206.

With the apparatus of the invention, when an end user is not allowed to use some network applications due to expense issue or other policy constraint, although the terminal will automatically attempt to send a Ping request, that Ping request can not access wireless network, nor can it reach core network, so as to avoid consuming RF resource and core network resource.

To a person skilled in the art, it is obvious that the invention is not limited to the details of the above illustrative embodiments, and the invention may be implemented with other embodiments without departing from the spirit and essential features of the invention. Therefore, viewed from any perspective, those embodiments should be considered as illustrative rather than restrictive, the scope of the invention is defined by accompany claims rather than by the above description, thus, all variations falling within the meaning and scope of equivalence of claims are to be encompassed in the invention. In addition, it is obvious that the term "comprising" does not preclude other element or step, and single form does not preclude plural form. The term first, second etc is used to denote name, rather than any particular sequence.

The invention claimed is:

1. A method for controlling a terminal's access to a wireless network, comprising:
   when information stored in a monitor unit of a core network and related to access status of an application has been updated, sending, by the monitor unit, a first notification message to a mobile device management server, the first notification message contains therein the updated information related to the access status of the application;
   determining, by the mobile device management server based on the information, a mobile terminal involved in the information and access status of a corresponding application on the mobile terminal;
   sending, by the mobile device management server, a second notification message to the determined mobile terminal, the second notification message contains therein the determined access status of the applications;
   updating, by the mobile terminal based on the access status of the application contained in the received second notification message, locally stored access status of the application;
   when an application on the mobile terminal initiates a request to access the wireless network, determining, by the mobile terminal based on the locally stored access status of the application, whether it is rejected or allowed to access the wireless network.

2. The method according to claim 1, wherein, the monitor unit is a Policy and Charging Rule Function or an Online Charging System.

3. The method according to claim 1, wherein, the information related to the access status of an application is PCC rules or account expense information.

4. The method according to claim 1, wherein, the access status of the application is forbidding to access or allowing to access.

5. An apparatus for controlling a terminal's access to a wireless network in a monitor unit of a core network, comprising:
   a first sending device configured to send a first notification message to a mobile device management server when information stored in the monitor unit and related to access status of an application has been updated, the first notification message contains therein the updated information related to access status of the application;
   wherein the first notification message is configured to prompt the mobile device management server to send a second notification message to a mobile terminal to update, based on the access status of application contained in the received second notification message, locally stored access status of the application and when an application on the mobile terminal initiates a request to access the wireless network, to determine, based on the locally stored access status of the application, whether it is rejected or allowed to access the wireless network.

6. The apparatus according to claim 5, wherein, the monitor unit is a Policy and Charging Rule Function or an Online Charging System.

7. The apparatus according to claim 5, wherein, the information related to access status of an application is PCC rules or account expense information.

8. The apparatus according to claim 5, wherein, the access status of the application is forbidding to access or allowing to access.

9. An apparatus for controlling terminal's access to a wireless network in a mobile device management server, comprising:
   a first receiving device configured to receive a first notification message from a monitor unit of a core network, the first notification message contains therein information related to access status of an application;
   a first determining device configured to determine, based on information contained in the first notification message, a mobile terminal involved in the information and access status of a corresponding application on the mobile terminal;
   a second sending device configured to send a second notification message to the determined mobile terminal, the second notification message contains therein the determined access status of the application;
   wherein the second notification message is configured to prompt the determined mobile terminal to update, based on the access status of the application contained in the received second notification message, locally stored access status of the application and when the application on the determined mobile terminal initiates a request to access the wireless network, to determine, based on the locally stored access status of the application, whether it is rejected or allowed to access the wireless network.

10. The apparatus according to claim 9, wherein, the monitor unit is a Policy and Charging Rule Function or an Online Charging System.

11. The apparatus according to claim 9, wherein, the information related to access status of an application is PCC rules or account expense information.

12. The apparatus according to claim 9, wherein, the access status of the application is forbidding to access or allowing to access.

13. An apparatus in a mobile terminal for controlling the terminal's access to a wireless network, comprising:
- a receiving device configured to receive a notification message from a mobile device management server, the notification message contains therein access status of an application;
- an updating device configured to update, based on the access status of the application contained in the received notification message, locally stored access status of the application;
- a determining device configured to determine, when an application on the mobile terminal initiates a request to access the wireless network, whether it is rejected or allowed to access the wireless network based on the locally stored access status of the application.

14. The apparatus according to claim 13, wherein, the access status of the application is forbidding to access or allowing to access.

\* \* \* \* \*